United States Patent
Rowling

(10) Patent No.: US 9,297,224 B2
(45) Date of Patent: Mar. 29, 2016

(54) CENTRALISER

(75) Inventor: Peter Sidney Rowling, Kalgoorlie (AU)

(73) Assignee: Teek Mining Solutions Pty. Ltd., Kalgoorlie, Western Australia (AU)

( * ) Notice: Subject to any disclaimer, the term of this patent is extended or adjusted under 35 U.S.C. 154(b) by 377 days.

(21) Appl. No.: 13/816,974

(22) PCT Filed: Aug. 16, 2011

(86) PCT No.: PCT/AU2011/001046
§ 371 (c)(1),
(2), (4) Date: Feb. 14, 2013

(87) PCT Pub. No.: WO2012/021927
PCT Pub. Date: Feb. 23, 2012

(65) Prior Publication Data
US 2013/0146364 A1    Jun. 13, 2013

(30) Foreign Application Priority Data

Aug. 16, 2010  (AU) ................................ 2010903662

(51) Int. Cl.
| | | |
|---|---|---|
| *E21B 19/24* | (2006.01) | |
| *E21B 7/04* | (2006.01) | |
| *F16C 31/02* | (2006.01) | |
| *F16C 35/02* | (2006.01) | |

(52) U.S. Cl.
CPC ................. *E21B 19/24* (2013.01); *E21B 7/046* (2013.01); *F16C 35/02* (2013.01); *F16C 2226/60* (2013.01); *F16C 2226/70* (2013.01); *F16C 2352/00* (2013.01)

(58) Field of Classification Search
CPC .......... F16C 31/02; F16C 35/02; F16C 35/10; F16C 43/02; F16C 2226/60; F16C 2226/62; F16C 2226/70; F16C 2226/76; F16C 2352/00; F16C 35/077; F16C 35/067; E21B 19/24; E21B 7/046
See application file for complete search history.

(56) References Cited

U.S. PATENT DOCUMENTS

| | | | | |
|---|---|---|---|---|
| 224,103 | A | * 2/1880 | Morse ................... | F16D 1/0876 |
| | | | | 403/356 |
| 1,363,663 | A | * 12/1920 | Langton .................... | 384/286 |
| 1,592,586 | A | * 7/1926 | Wills ........................ | 384/260 |
| 1,608,626 | A | * 11/1926 | Schwemlein ............ | 384/270 |
| 1,717,873 | A | * 6/1929 | Brush ....................... | 384/281 |
| 2,897,017 | A | * 7/1959 | Kubodera ................. | 384/273 |
| 3,441,323 | A | * 4/1969 | Huffman et al. .......... | 384/24 |
| 3,508,798 | A | * 4/1970 | Geuss ....................... | 384/288 |
| 3,650,576 | A | * 3/1972 | Hughes ..................... | 384/41 |

(Continued)

FOREIGN PATENT DOCUMENTS

| | | |
|---|---|---|
| CN | 101424162 A | 5/2009 |
| DE | 748939 C | * 11/1944 |

(Continued)

OTHER PUBLICATIONS

PCT Search Report for PCT Serial No. PCT/AU2011/001046 dated Nov. 15, 2011.

*Primary Examiner* — Alan B Waits
(74) *Attorney, Agent, or Firm* — McCormick, Paulding & Huber LLP

(57) ABSTRACT

A centralizer for use in a rock drill rig is disclosed. The centralizer includes a clamping member which moves generally tangentially to a bush, in order to clamp the bush in place within the centralizer.

18 Claims, 4 Drawing Sheets

(56) References Cited

U.S. PATENT DOCUMENTS

| | | | |
|---|---|---|---|
| 3,661,376 A | * | 5/1972 | Hill et al. .................... 269/75 |
| 3,749,454 A | * | 7/1973 | Bailey et al. ................. 384/24 |
| 3,960,416 A | * | 6/1976 | McCloskey ................. 384/209 |
| 4,182,424 A | | 1/1980 | Prebensen |
| 4,380,405 A | * | 4/1983 | Kaneki ............... F04D 29/4206 403/318 |
| 4,402,557 A | | 9/1983 | Paasonen et al. |
| 4,412,753 A | * | 11/1983 | Linn ............................ 384/437 |
| 4,697,830 A | * | 10/1987 | Wood et al. .................... 285/27 |
| 5,118,058 A | * | 6/1992 | Richter ....................... 248/183.2 |
| 5,988,298 A | * | 11/1999 | Cheng et al. ................. 173/147 |
| 6,736,225 B2 | * | 5/2004 | Pierce ............................ 175/58 |
| 8,360,648 B2 | * | 1/2013 | Maruyama et al. ........... 384/279 |
| 8,584,774 B2 | * | 11/2013 | Connell ........................ 175/220 |
| 8,939,647 B2 | * | 1/2015 | Holstein et al. .............. 384/263 |
| 2011/0164840 A1 | * | 7/2011 | Hayashi et al. ............... 384/416 |

FOREIGN PATENT DOCUMENTS

| | | | |
|---|---|---|---|
| DE | 3815318 A1 | * 11/1989 | ............. F16C 23/04 |
| DE | 10244533 B3 | * 1/2004 | ................ F16C 9/04 |

\* cited by examiner

CENTRALISER

CROSS REFERENCE TO RELATED APPLICATIONS

This application is entitled to the benefit of and incorporates by reference essential subject matter disclosed in International Patent Application No. PCT/AU2011/001046 filed on Aug. 16, 2011 and Australian Patent Application No. 2010903662 filed Aug. 16, 2010.

FIELD OF THE INVENTION

The present invention relates to a centraliser clamp used within a rock drill rig, such as a face-drilling rock drill used in underground mining.

BACKGROUND TO THE INVENTION

An underground rock drill rig generally has at least one boom on which is mounted a feed rail. The feed rail supports a drill and its associated drill rod.

The drill is mounted to the rail, so as to be able to move along the length of the rail. When the drill is in an initial position at the rear of the rail, the drill rod is supported at the front of the rail by a bush, which is held in place by a centralising clamp.

Centralising clamps are generally formed from two pieces, each of which has a semi-circular recess which can locate about one side of the bush. The two pieces can be clamped together using a nut and bolt in order to hold the bush in place in between the two pieces.

There are some inherent weaknesses in this arrangement. The entire clamping force acts through the bolt, providing significant stress concentrations about the bolt. Away from the line of the bolt, the clamping forces are significantly dissipated, meaning that there can be a propensity for the bush to move or vibrate. Additionally, vibration during use can cause loosening of the nut, exacerbating the problem. Movement of the bush causes a significant increase in the wear rate of the centralising clamp, as well as a loss of accuracy in drilling.

As the two pieces must be able to move relative to each other, it is only possible to weld one of the pieces in position. This limits stability of the arrangement, and can lead to cracking and fatigue failure.

A further limitation of the known arrangement is that the bush is located at a designated height about the rail, being the same height as the drill. Should the rail bend, the location of the bush can not be adjusted. When this happens, it is necessary to cut away the centraliser clamp and reposition at a new location. This can cause significant down-time for the drill rig.

The present invention seeks to provide an alternative method of clamping a centralising bush in position.

SUMMARY OF THE INVENTION

According to one aspect of the present invention there is provided a centraliser clamp for a locating bush in a drilling rig, the clamp including an aperture for receiving a bush, and a clamping member having a bearing surface, the clamping member being movable relative to the bush-receiving aperture such that the bearing surface can be moved within the bush-receiving aperture in order to secure the bush within the aperture.

Preferably, the clamping member is movable in a direction substantially perpendicular to a central axis of the bush.

It is preferred that the clamping member be moveable by mechanical means. The clamping member may include an internally threaded cylindrical aperture arranged to engage with an externally threaded adjustment bolt, such that rotation of the adjustment bolt causes movement of the clamping member along the bolt.

In a preferred embodiment, the clamp has a body portion having a substantially cylindrical aperture in which the bush is received, the body portion having a first side opposite a second side, and a clamping member receiving aperture extending internally of the first side of the body portion and an adjustment bolt receiving aperture extending internally of the second side of the body portion.

Preferably, the clamping member is substantially prismatic. The bearing surface of the clamping member may be bevelled. The arrangement is such that in use the bearing surface is substantially tangential to the bush.

In a preferred embodiment, the bush has a substantially planar bearing flat arranged to engage with the bearing surface of the clamping member.

According to a second aspect of the present invention there is provided a centraliser for a locating bush in a drilling rig, the centraliser comprising a centraliser clamp and an associated supporting structure, the centraliser clamp including a body portion having an aperture for receiving a bush, and a base portion which is substantially perpendicular to the bush-receiving aperture, the base portion arranged to be fixed to the supporting structure, whereby the height of the base portion relative to the supporting structure can be adjusted.

Preferably, the supporting structure includes a top plate onto which the base portion of the clamp can be connected, and at least one spacer located between the top plate and the base portion in order to determine the height of the bush relative to the supporting structure.

BRIEF DESCRIPTION OF THE DRAWINGS

It will be convenient to further describe the invention with reference to preferred embodiments of the centraliser clamp of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
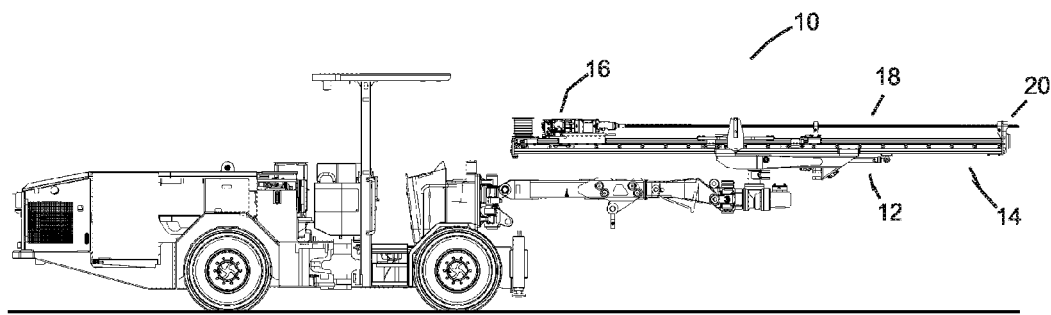
FIG. 1 is a schematic view of a face-drilling rock drill rig within which a centraliser clamp in accordance with the present invention may be used.

Referring to the Figures, FIG. 1 shows a face-drilling rock drill rig 10 as used in underground mining operations. The drill rig 10 includes a boom 12, on which is mounted a rail 14. A drill 16 is mounted to the rail 14, and is arranged to move along the rail 14 under the control of an operator. A drill rod 18 extends away from the drill 16, parallel to the rail 14. A centraliser 20 is located at an outer end of the rail 14, in order to support the outer end of the drill rod 18.

Figure 2:
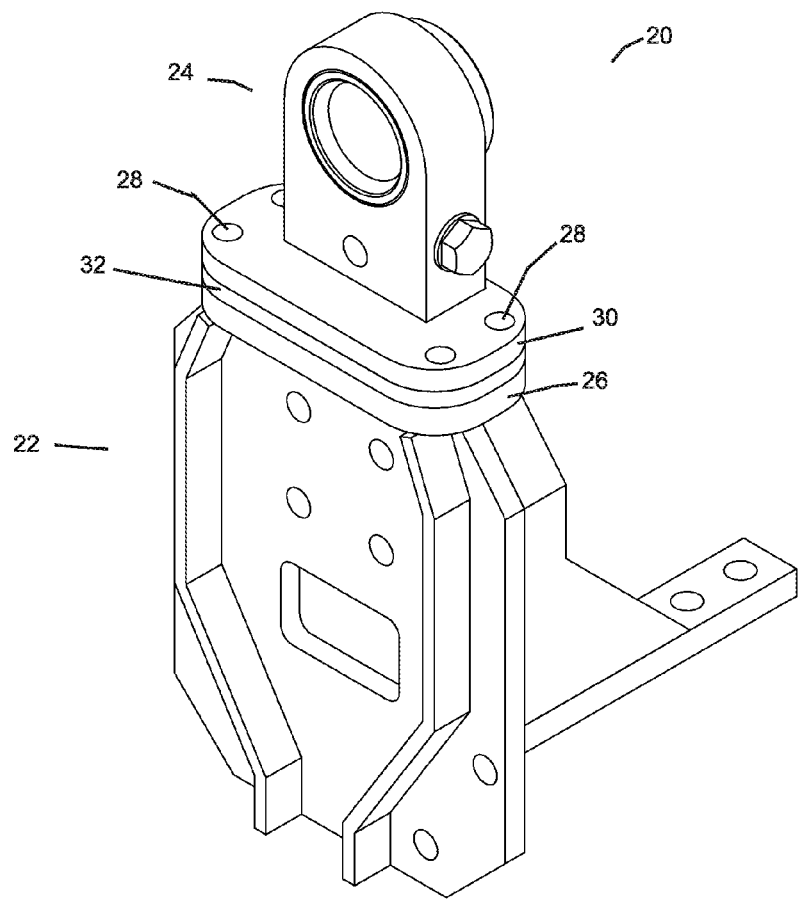
FIG. 2 is a perspective of a centraliser in accordance with the present invention.
Figure 3:
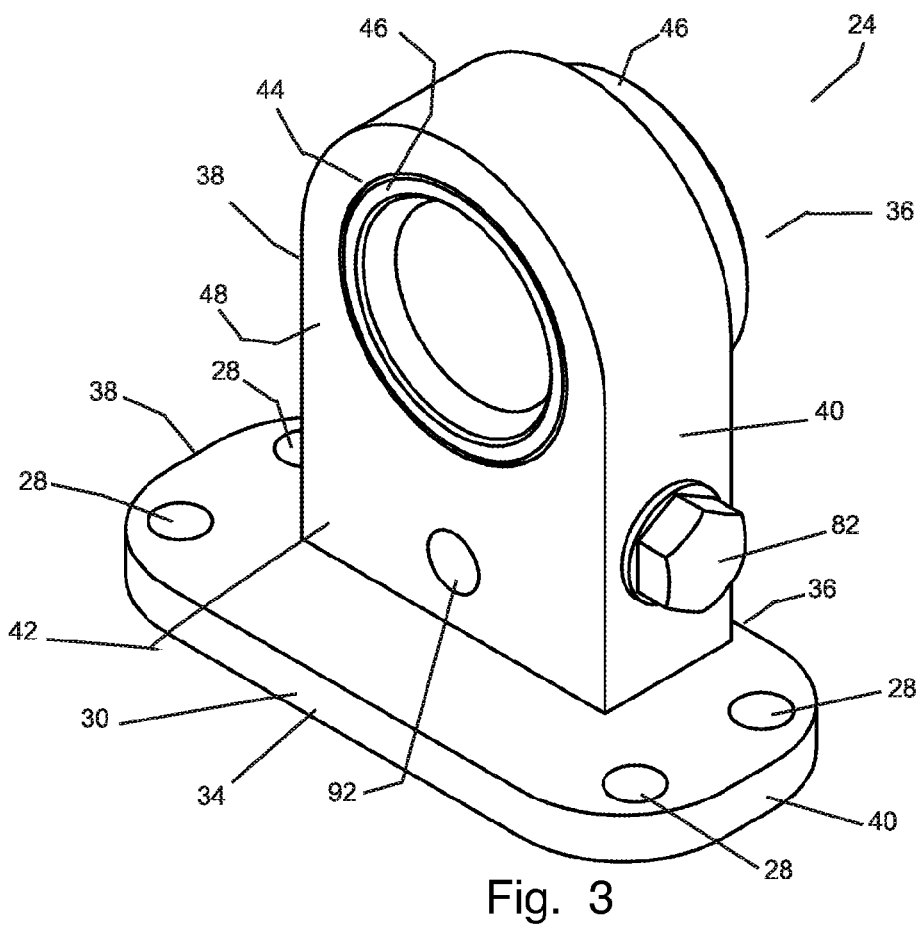
FIG. 3 is an enlarged perspective of a centraliser clamp within the centraliser of FIG. 2.
Figure 4:
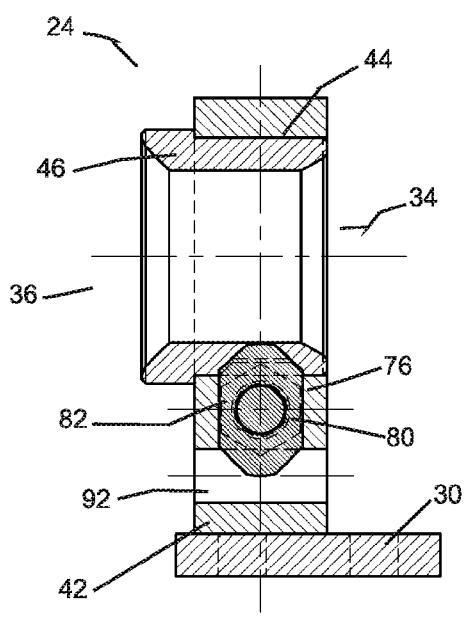
FIG. 4 is a cross section through the centraliser clamp of FIG. 3.
Figure 5:
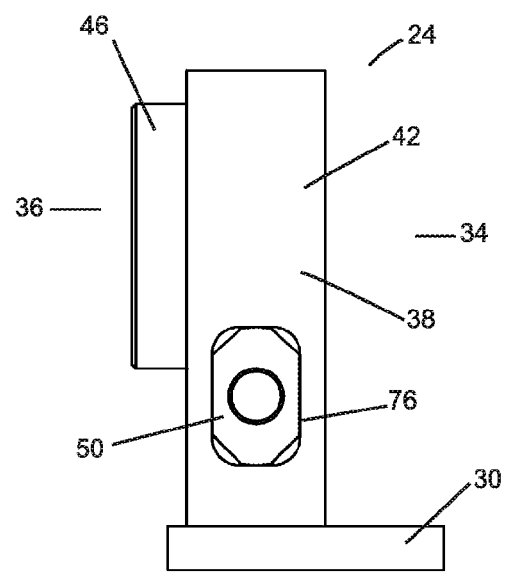
FIG. 5 is a side view of the centraliser clamp of FIG. 3, shown from the reverse side.

FIG. 2 shows a centraliser 20 having a supporting structure 22 and a centraliser clamp 24. The supporting structure 22 includes a substantially rectangular top plate 26 having a bolt-receiving aperture near each of its corners. The top plate 26 has a substantially flat upper surface which is substantially horizontal when the centraliser 20 and drill rig 10 are in the position shown in FIG. 1.

The centraliser clamp 24 has a substantially rectangular base portion or base plate 30, having a substantially flat lower surface of similar dimension to the upper surface of the top plate 26. The base plate 30 has bolt-receiving apertures 28 which are aligned with the bolt-receiving apertures of the top plate 26 when the base plate 30 is placed over the top plate 26. Bolts (not shown) can be located within the aligned bolt-receiving apertures in order to fix the centraliser clamp 24 to the supporting structure 22.

The centraliser 20 includes a spacer 32 located between the top plate 26 of the supporting structure 22 and the base plate 30 of the centraliser clamp 24. The spacer 32 is prismatic, with ends similar in size and shape to the flat surfaces of the top plate 26 and base plate 30. It has apertures aligned with the bolt-receiving apertures 28 of the top plate 26 and base plate 30.

The effect of the spacer 32 is to alter the height of the centraliser clamp 24 relative to the supporting structure 22. It is envisaged that a number of spacers 32 of differing widths may be provided, with the choice of an appropriate spacer or spacers 32 providing a user with the ability to choose a desired height for the centraliser clamp 24.

The centraliser clamp 24 can be seen more clearly in FIGS. 3 to 6.

The centraliser clamp 24 has a front end 34, a rear end 36, a first side 38 and a second side 40. These can be seen as corresponding to the four sides of the rectangular base plate 30.

The centraliser clamp 24 includes a body portion 42 which extends upwardly from the base plate 30 abutting the rear end 36. The body portion 42 is prismatic, with its ends being arch-shaped, and has a thickness about one half that of the breadth of the base plate 30.

Figure 8:
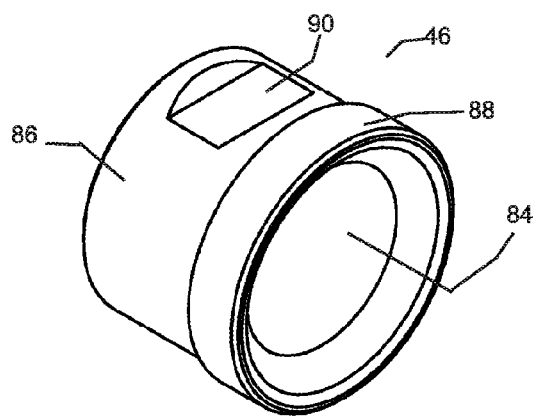
FIG. 8 is a perspective of a bush for use in conjunction with the centraliser of FIG. 2.

The body portion 42 includes a cylindrical bush-receiving aperture 44, arranged to receive a bush 46 such as that of FIG. 8. The bush-receiving aperture 44 passes from the rear end 36 of the body portion 42 to a front face 48 oriented towards the front end 34 of the centraliser clamp 24.

Figure 7:
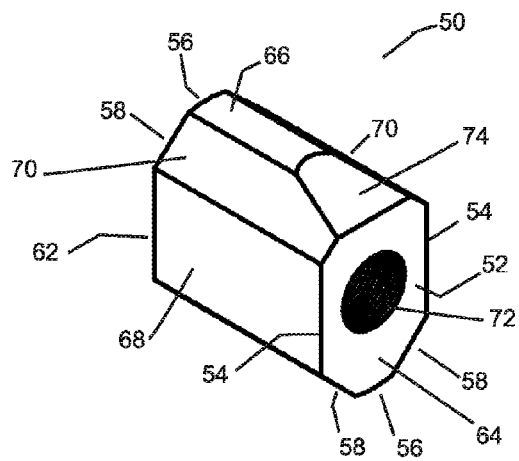
FIG. 7 is a perspective of a clamping member from within the centraliser of FIG. 2.

Clamping of the bush 46 within the bush-receiving aperture 44 is achieved through use of a clamping member 50. The clamping member 50, which can be seen in FIG. 7, is formed from a substantially prismatic member having octagonal ends 52. Each of the ends 52 has two vertical edges 54 representing about 60% of the height of the ends; two horizontal edges 56 having a length about one third of the vertical edges 54; and four diagonal edges 58 disposed at 45% to the vertical edges 54 and horizontal edges 56, each having a length about one half of the vertical edges 54. The clamping member 50 has a first end 62, a second end 64, a top wall 66 extending between the respective top horizontal edges 56 of the ends 52; a bottom wall extending between the respective bottom horizontal edges 56 of the ends 52; two side walls 68 extending between respective vertical edges 54 of the ends 52; two upper diagonal walls 70 extending between respective diagonal edges 58 adjacent the top horizontal edges 56 of the ends 52; and two lower diagonal walls extending between respective diagonal edges 58 adjacent the lower horizontal edges 56 of the ends 52. An internally threaded longitudinal aperture 72 extends through the clamping member 50 from the first end 62 to the second end 64, through the centre of the clamping member 50.

The clamping member 50 has a bevelled bearing surface 74 located along its top wall 66, extending from the second end 64. The bearing surface 74 extends along about 40% of the top wall 66, and is angled at about 15° relative to the top wall 66. The bearing surface 74 causes a taper of the upper diagonal walls 70 towards the second end 64.

Figure 6:
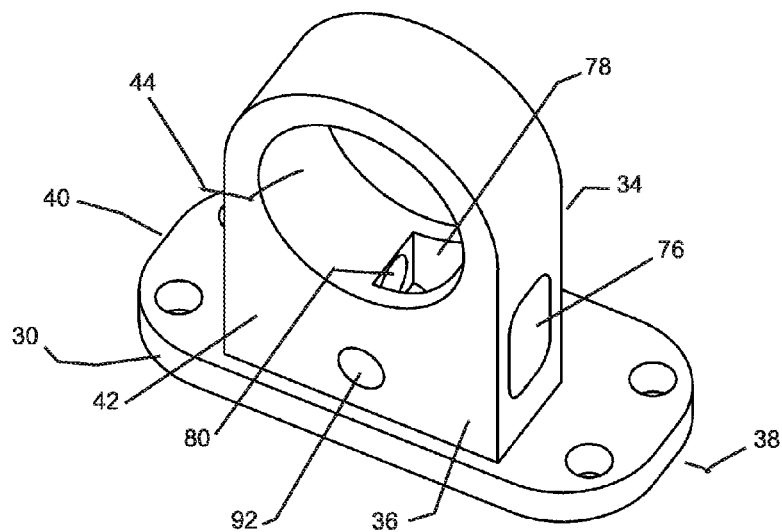
FIG. 6 is a perspective of the centraliser clamp of FIG. 3, shown from the reverse side with a bush and pin removed.

The body portion 42 of the centraliser clamp 24 includes a clamping member receiving aperture 76, which extends internally of the body portion 42 from the first side 38. The clamping member receiving aperture 76 is sized and shaped so as to receive the clamping member 50 in a loose sliding fit, and positioned such that when the first end 62 of the clamping member 50 is generally flush with the first side 38 of the body portion 42, the bearing surface 74 locates substantially tangentially to the bush-receiving aperture 44. The clamping member receiving aperture 76 has an opening 78 within the bush-receiving aperture 44, as can be seen in FIG. 6.

The body portion 42 of the centraliser clamp 24 also includes an adjustment bolt receiving aperture 80 extending from the second side 40 of the body portion 42 beneath the bush-receiving aperture 44 to the clamping member receiving aperture 76. The adjustment bolt receiving aperture 80 is sized and aligned such that when the clamping member 50 is in position within the clamping member receiving aperture 76, the adjustment bolt receiving aperture 80 is aligned with the internally threaded longitudinal aperture 72 of the clamping member 50.

An externally threaded adjustment bolt 82 can thus be entered through the second side 40 of the body portion 42 and engage the internally threaded longitudinal aperture 72 of the clamping member 50.

The bush 46 is generally cylindrical. It has an internal bore 84 arranged to receive and support a drill rod 18. The internal bore 84 is tapered at either end of the bush 46, forming introducing regions for ease of assembly.

The bush 46 has a stepped outer radius, with a smaller radius portion 86 sized to fit loosely within the bush-receiving aperture 44 and a larger radius portion 88 arranged to locate outside the bush-receiving aperture 44, against the rear end 36 of the body portion 42.

The bush 46 has a bearing flat 90 located on the smaller radius portion 86. The bearing flat 90 comprises a portion of an outer surface of the bush 46 which is substantially planar, and parallel to a central axis of the bush 46.

In use, the supporting structure 22 of the centraliser 20 is welded to the boom 12. A drill 16 is located on the rail 14. A centraliser clamp 24 is then bolted to the supporting structure 22, with appropriate spacers 32 being used to ensure that the bush 46 is axially aligned with the drill 16.

When the bush 46 is located within the bush-receiving aperture 44, it can be rotated until the bearing flat 90 is positioned adjacent the opening 78. The clamping member 50 can be inserted into the receiving aperture 76 from the first side 38 of the centraliser clamp 24, and the adjustment bolt 82 inserted into the adjustment bolt receiving aperture 80 from the second side 40. Once the adjustment bolt 82 engages the internally threaded longitudinal aperture 72 of the clamping member 50, rotation of the adjustment bolt 82 translates to lateral movement of the clamping member 50.

The adjustment bolt 82 is rotated to cause movement of the clamping member 50 into the body portion 42, and of the bearing surface 74 into the bush-receiving aperture 44. The bearing surface 74 acts against the bearing flat 90 of the bush 46, clamping the bush 46 into position within the bush-receiving aperture 44. The action is similar to a wedging action, allowing for tight clamping of the bush 46 into position despite variances in surface machining and the like. Should slight loosening occur, the clamping member 50 can be readily re-tightened.

An access hole 92 is provided in the body portion 42, passing from the front end 34 to the rear end 36 through the base of the clamping member receiving aperture 76. The access hole is provided so that if grit or fines particles become trapped within the receiving aperture 76, they can be readily cleaned out.

Figure 9:
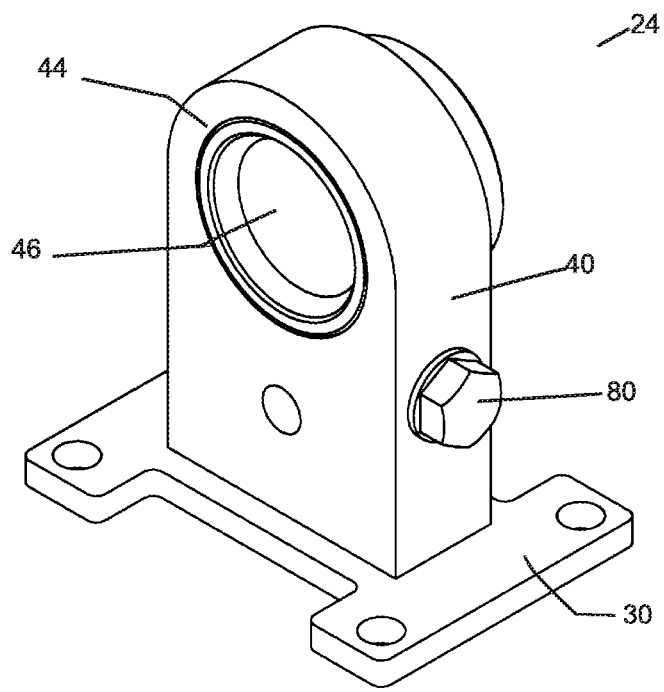
FIG. 9 is a perspective of a second embodiment of a centraliser clamp for use in the centraliser of FIG. 2.
Figure 10:
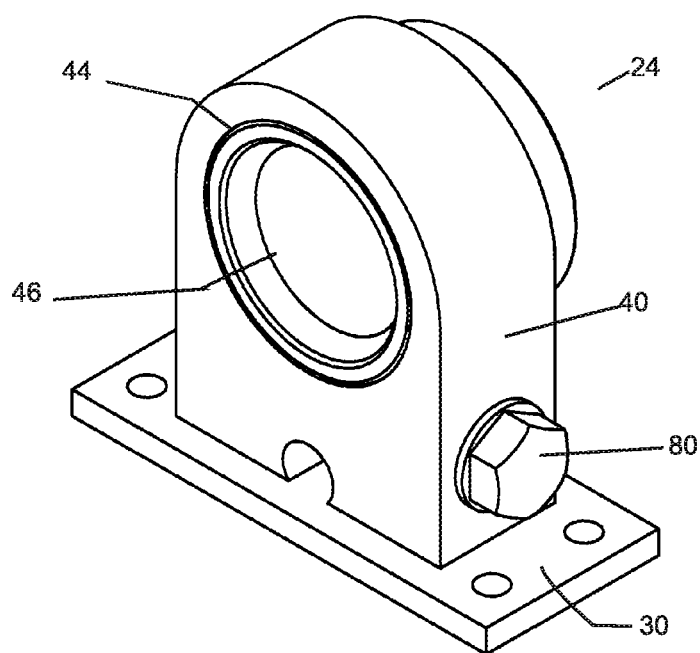
FIG. 10 is a perspective of a third embodiment of a centraliser clamp for use in the centraliser of FIG. 2.

It will be appreciated that the shape of the centraliser clamp 24 can be adjusted to suit particular drill rigs 10 without departing from the scope of the present invention. FIGS. 9 and 10 show two such centraliser clamps 24, with like numerals referring to like features.

Modifications and variations as would be apparent to a skilled addressee are deemed to be within the scope of the present invention.

What is claimed is:

1. A centraliser for a locating bushing in a drilling rig, the centraliser comprising:
    a centraliser clamp, the centraliser clamp comprising a body portion having a substantially cylindrical aperture for receiving the bushing, the body portion having a first side opposite a second side; and
    a clamping member, the clamping member having a first bearing surface, and the bushing having a second bearing surface;
    the aperture for receiving the bushing having an internal face;
    the body portion having a clamping member receiving aperture internally of the first side of the body portion arranged to receive the clamping member; and an adjuster receiving aperture internally of the second side of the body portion arranged to receive an adjuster;
    the clamping member being moveable relative to the bush-receiving aperture such that the first bearing surface is moved within the bush-receiving aperture in order to bear against the second bearing surface such that the bushing bears against the internal face of the aperture;
    wherein movement of the clamping member relative to the bush-receiving aperture is effected by operation of the adjuster.

2. The centraliser as claimed in claim 1, wherein the bushing has a central axis, the bushing having an internal bore which is symmetrical about the central axis, and wherein the clamping member is movable in a direction substantially perpendicular to the central axis of the bushing in order to secure the bushing against the internal face of the aperture.

3. The centraliser as claimed in claim 2, wherein the clamping member is prismatic.

4. The centraliser as claimed in claim 2, wherein the second bearing surface of the bushing is a substantially planar bearing flat arranged to engage with the first bearing surface of the clamping member.

5. The centraliser as claimed in claim 2, wherein the first bearing surface of the clamping member is substantially tangential to the bushing.

6. The centraliser as claimed in claim 1, wherein the adjuster comprises an externally threaded adjustment bolt; and the clamping member includes an internally threaded cylindrical aperture arranged to engage with the externally threaded adjustment bolt, such that rotation of the adjustment bolt causes movement of the clamping member along the bolt.

7. The centraliser as claimed in claim 6, wherein the clamping member is prismatic.

8. The centraliser as claimed in claim 6, wherein the second bearing surface of the bushing is a substantially planar bearing flat arranged to engage with the first bearing surface of the clamping member.

9. The centraliser as claimed in claim 6, wherein the first bearing surface of the clamping member is substantially tangential to the bushing.

10. The centraliser as claimed in claim 1, wherein the clamping member is prismatic.

11. The centraliser as claimed in claim 10, wherein the first bearing surface is bevelled.

12. The centraliser as claimed in claim 11, wherein the second bearing surface of the bushing is a substantially planar bearing flat arranged to engage with the first bearing surface of the clamping member.

13. The centraliser as claimed in claim 10, wherein the second bearing surface of the bushing is a substantially planar bearing flat arranged to engage with the first bearing surface of the clamping member.

14. The centraliser as claimed in claim 1, wherein the second bearing surface is formed by a substantially planar bearing flat on the bushing.

15. The centraliser as claimed in claim 1, wherein the first bearing surface is substantially tangential to the bushing.

16. The centraliser as claimed in claim 1, wherein the centraliser further comprises supporting structure associated with the centraliser clamp, and the centraliser clamp includes: a body portion having the aperture for receiving a bush; and a base portion oriented substantially perpendicular to the bush-receiving aperture, the base portion arranged to be fixed to the supporting structure, whereby the height of the base portion relative to the supporting structure can be adjusted.

17. The centraliser as claimed in claim 16, wherein the supporting structure includes a top plate to which the base portion of the clamp can be connected, and at least one spacer located between the top plate and the base portion in order to determine the height of the bush relative to the supporting structure.

18. The centraliser as claimed in claim 1, wherein the second bearing surface of the bushing is a substantially planar bearing flat arranged to engage with the first bearing surface of the clamping member.

* * * * *